Figure 2:
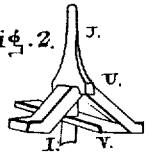
Figure 1:
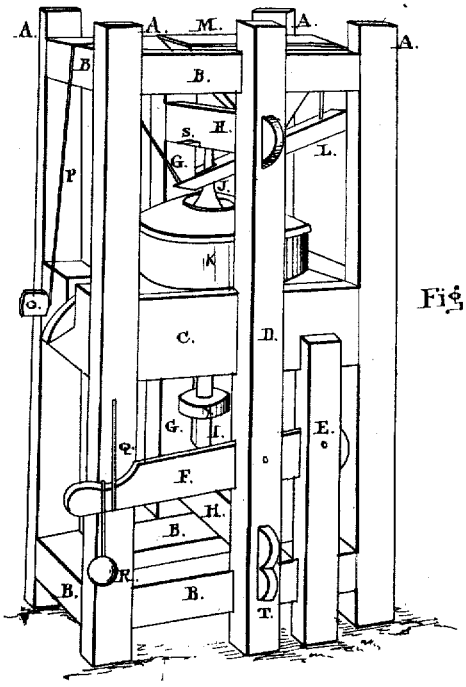

8700X

F. Smith.

Grist Mill.

Patented Mar. 18, 1835.

Mar. 18 1835

Frederick Smith, of Evans, N. York 8700X
Letters Patent 3-18-1835

The schedule referred to in these Letters Patent and making part of the same, containing a description in the words of the said Frederick Smith himself of his improvement in a mill for grinding grain with small mill stones. –

---

To all to whom these presents shall come: Be it known that I Frederick Smith of the town of Evans in the County of Erie & State of New York, a citizen of the United States, have invented a new and useful improvement in the construction of a mill for grinding grain with small mill stones and that the following is a full and exact description or specification of the construction and operation of the said machine as invented and improved by me reference being had in the said explanation and description to the drawing which is hereto annexed.

A.A.A.A. are posts three inches square and 4 feet long and are the corner posts of the frame B.B.B.B.B. are girts, eight in number three inches square and two feet & six inches long four of which are framed into the posts at the Top and four at the bottom constituting the frame. C.C.C.C are also girts two feet six inches long seven inches wide & three inches thick framed into the posts in the middle with two sticks of timber 3 inches square framed across for the bed stone to rest upon – D is a sliding post three inches square and three feet six inches long for the purpose of supporting and connecting the bridge trees H.H. It slides in grooves one inch deep cut in the girts B.C.B. E is a post three inches square and two feet long in which rests one end of the lever F. it is firmly secured to the girts B & C.
F is a lever two feet six inches long & three inches wide and one & a half inch thick. It is for the purpose of raising or lowering the bridge trees H.H. one end of it rests in the post E where it is secured by a pin, it passes through the sliding post D. and the other end is secured and governed by the string Q to which is attached the weight R.
G.G. are two posts three inches square & framed into the girts B.C.B. on the side of the frame opposite to the sliding post D..
H.H are the bridge trees three inches square, at one end framed into the posts G.G. and at the other into the slidging post D, they are secured at each end by pins but moveable in a small degree. I is an iron spindle one & a fourth inch square except where it passes through the bed stone where it is one & one fourth diameter, it is eighteen inches in

8700X length and has a round steel point at each end one of which rests in the socket in the lower step the other supports the bail v. (fig 2): J (fig 2) is the damsel of iron thirteen inches in length at one end about two inches wide and three fourths of an inch thick and tapering to the other end into an eight square of three fourths of an inch in thickness from the widest end are two projections of about three fourths of an inch in length and a space of one and a half inch between them, fitted to the bail V (fig. 2) the smallest end is of steel & rounded so as to fit into a socket in the upper step S. K is the curb suited to the dimentions of the stones. L is the shoe made in the usual form & connected by the string P. with the pully O by turning which the shoe may be elevated or depressed. M is the hopper made in the usual form loose at the top and tapering nearly to a point at the bottom. N is the spout to convey the meal from the stones to the bag or bolt X is a pulley or pinion on the spindle through which motion is communicated to the stones. S is a step. There is one on each of the bridge trees four inches long and two and a half inches wide & — thick placed in a groove cut in the bridge trees are a composition of metal & have a socket each, the lower one to receive the end of the spindle I & the upper one fitted for the damsel J. T. is a wedge or key to draw the bridge trees together. V (fig 2) is the bail of iron one & a half inch wide by one in thickness, it is arching in the middle, but each end is turned out horizontally and is about six and a half inches from end to end V (fig 2.) is a driver of iron six and a half inches long and two & a half wide in the middle tapering to one and a quarter inch at each end. It has a square hole in the middle for the spindle to pass through. The stone is balanced on the bail & put in motion by the driver. the eye of the stone should be three inches less in diameter than the length of the bail or driver.

What I claim as my own invention and not previously known in the above described machine is, the power given by the lever F & weight R. through the medium of the slide D. Bridge tree H & damsel I to increase or diminish the pressure upon the runner (which is inclosed in the curb K) and also the power given by the same lever F & weight R to regulate the stones while grinding —

Exd. M.G.C.

Witnesses
George H. Bush
Saml. D. Flagg

Frederick Smith (Drawing)

[illegible]